United States Patent
Pradhan et al.

(10) Patent No.: US 12,051,229 B2
(45) Date of Patent: Jul. 30, 2024

(54) SYSTEM AND METHOD FOR ATTENTION-BASED SURFACE CRACK SEGMENTATION

(71) Applicant: Tata Consultancy Services Limited, Mumbai (IN)

(72) Inventors: Prakhar Pradhan, Bangalore (IN); Hrishikesh Sharma, Bangalore (IN); Balamuralidhar Purushothaman, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 423 days.

(21) Appl. No.: 17/574,856

(22) Filed: Jan. 13, 2022

(65) Prior Publication Data

US 2022/0222914 A1 Jul. 14, 2022

(30) Foreign Application Priority Data

Jan. 14, 2021 (IN) .............................. 202121001816

(51) Int. Cl.
*G06V 10/28* (2022.01)
*G06F 18/2413* (2023.01)
(Continued)

(52) U.S. Cl.
CPC .............. *G06V 10/26* (2022.01); *G06V 10/28* (2022.01); *G06V 10/44* (2022.01);
(Continued)

(58) Field of Classification Search
None
See application file for complete search history.

(56) References Cited

U.S. PATENT DOCUMENTS

2018/0070058 A1* 3/2018 Yonekawa ....... G08G 1/096716
2019/0279001 A1* 9/2019 Yamazaki .............. G06V 20/56
(Continued)

FOREIGN PATENT DOCUMENTS

CN 111222580 A * 6/2020 ......... G01N 21/8851
CN 111353396 A 6/2020
(Continued)

OTHER PUBLICATIONS

Feng et al., "Automatic Pixel-Level Crack Detection on Dam Surface Using Deep Convolutional Network," Sensors, 20, 2069 (2020).

*Primary Examiner* — Mohammed Rachedine
(74) *Attorney, Agent, or Firm* — Finnegan, Henderson, Farabow, Garrett & Dunner, LLP (57) ABSTRACT

This disclosure relates to a system and method for attention-based surface crack segmentation. Existing methods do not efficiently handle the sub-problem of data imbalance and inaccurate predicted pixels are ignored. The present disclosure obtains a binary edge map by passing a m-channel image through an edge detection algorithm and concatenate the obtained binary edge map with a channel dimension to obtain a (m+1)-channel image. Feature maps are extracted from an encoder and a decoder by feeding the obtained (m+1)-channel image into a network, wherein the feature maps are convolved with an attention mask and merged in a fused network. The merged feature maps are up sampled and concatenated to obtain a final fused feature map. The final fused feature map is passed through a sigmoid activation function to obtain a probability map which is iteratively thresholded to obtain a binary predicted image. The binary image is indicative of crack pixels.

15 Claims, 7 Drawing Sheets

(51) Int. Cl.
  *G06T 7/00* (2017.01)
  *G06T 7/13* (2017.01)
  *G06V 10/26* (2022.01)
  *G06V 10/44* (2022.01)
  *G06V 10/77* (2022.01)
  *G06V 10/80* (2022.01)
  *G06V 10/82* (2022.01)

(52) U.S. Cl.
  CPC ........ *G06V 10/7715* (2022.01); *G06V 10/806* (2022.01); *G06V 10/82* (2022.01)

(56) References Cited

U.S. PATENT DOCUMENTS

2021/0058598 A1* 2/2021 Sadasue .................... G06T 7/32
2023/0357998 A1* 11/2023 Sugawara ............... E01C 23/01

FOREIGN PATENT DOCUMENTS

| | | | | |
|---|---|---|---|---|
| CN | 212084165 U | 12/2020 | | |
| CN | 112232391 A | 1/2021 | | |
| CN | 112634292 A | 4/2021 | | |
| CN | 112819762 A | 5/2021 | | |
| CN | 113222904 A | 8/2021 | | |
| CN | 113284107 A | 8/2021 | | |
| CN | 113610778 A | 11/2021 | | |
| CN | 110503637 B | * 12/2022 | ........... | G06K 9/6268 |
| CN | 111179244 B | * 4/2023 | ........... | G06T 7/0004 |

* cited by examiner

SYSTEM AND METHOD FOR ATTENTION-BASED SURFACE CRACK SEGMENTATION

PRIORITY CLAIM

This U.S. patent application claims priority under 35 U.S.C. § 119 to: India Application No. 202121001816, filed on Jan. 14, 2021. The entire contents of the aforementioned application are incorporated herein by reference.

TECHNICAL FIELD

This disclosure relates generally to field of infrastructure monitoring using computer vision, and more particularly to a system and method for attention-based surface crack segmentation.

BACKGROUND

Infrastructures are facilities and services which are set up and operated in various countries, to support their economy and living conditions. Some of the examples of the infrastructures include bridges, dams, rail corridors, tunnels, pavements and roads, towers, and buildings etc., which are vast man-made objects, designed for long life after commissioning. Further, for the safety, durability, and other health parameters of the infrastructures during their service life span, it is required to detect any fault which is developing over time and attend such faults, via repairs, before it manifests into a catastrophe. Hence periodic health inspections, which can detect and quantify faults in a timely manner, are carried out, to provide aid in prioritizing and planning of infrastructure maintenance tasks. Further, periodic health monitoring of vast infrastructures is an important safety-related task, which is generally carried out via remote visual surveillance.

However, the task of periodic health monitoring of vast infrastructures through remote visual surveillance more specifically, a crack semantic segmentation is quite challenging due to large variations in surface defects, construction material, lighting conditions etc. Currently, there are various applications that require detection of cracks in the infrastructure monitoring, for example, crack detection on old bridges to estimate their age, road surface crack detection to avoid accidents, etc. The major problem is that cracks are very thin objects in nature and crack pixels cover a small portion of an image. Due to this, the data imbalance problem (the ratio of the number of background pixels to the number of foreground pixels is high) implicitly exists in the crack detection task. In machine learning algorithms, data imbalance can mislead the model training, and the trained model becomes biased towards the background pixels, which results in misprediction of the foreground pixels heavily. Further, there are some serious problems associated with the detection of crack pixels, which need to be addressed to obtain a better-labeled output image. Apart from the thin nature of cracks, cracks also do not have any specific shape and size due to which, detection of crack pixels becomes a highly challenging task because there is no specific pattern to be learned by the machine learning algorithm.

Existing methods, which solve the crack semantic segmentation problem, do not efficiently handle the sub-problem of data imbalance which means the number of background pixels is much larger than the number of foreground pixels, and this leads to inaccurate predictions by the network and pixel-level shifts in the predicted crack regions, as compared to the ground-truth. In recent works, the pixels which are wrongly predicted are ignored and the contribution from the correctly classified majority/background pixels dominates the training procedure. The relevance of using distribution of feature maps in scale-space in solving this problem is also ignored. Due to these shortcomings, the recent works may not perform well when the background of the image is noisy, and the cracks are thin.

SUMMARY

Embodiments of the present disclosure present technological improvements as solutions to one or more of the above-mentioned technical problems recognized by the inventors in conventional systems. For example, in one embodiment, a method for attention-based surface crack segmentation is provided. The method includes receiving, via one or more hardware processors, a m-channel image; passing, via the one or more hardware processors, the received m-channel image through an edge detection algorithm to obtain a binary edge map of the m-channel image; concatenating, via the one or more hardware processors, the obtained binary edge map along with a channel dimension to obtain a (m+1) channel image; extracting, via the one or more hardware processors, a first set of feature maps from a plurality of stages of an encoder and a decoder by feeding the obtained (m+1)-channel image into a network, wherein the network comprises of the encoder, the decoder, an enhancement encoder, and a fused network, and wherein each of the plurality of stages of the encoder and the decoder comprises of a corresponding attention module; convolving, via the one or more hardware processors, the extracted first set of feature maps from the plurality of stages of the encoder and the decoder with an attention mask to obtain a second set of feature maps by passing the first set of feature maps through the corresponding attention module comprised in each of the plurality of stages of the encoder and the decoder respectively; merging, via the one or more hardware processors, the second set of feature maps obtained from the corresponding attention module comprised in the plurality of stages of the encoder and the decoder in the fused network to obtain a plurality of merged feature maps, wherein the second set of feature maps obtained from the corresponding attention module comprised in the plurality of stages of the encoder is fed into the enhancement encoder to obtain an output, wherein the obtained output serves as an input to the fused network, and wherein the second set of feature maps from the corresponding attention module comprised in the plurality of stages of the decoder is sequentially fed into the fused network; up sampling, via the one or more hardware processors, the plurality of merged feature maps by passing each of the plurality of merged feature maps through each of a deconvolutional layer comprised in the fused network; concatenating, via the one or more hardware processors, the plurality of up sampled feature maps and passing the concatenated feature maps through a convolution layer to obtain a final fused feature map; passing, via the one or more hardware processors, the final fused feature map through a sigmoid activation function to obtain a final fused probability map; and iteratively thresholding, via the one or more hardware processors, the final fused probability map using a plurality of threshold values to obtain an optimal threshold value wherein the obtained optimal threshold value is used to obtain a binary predicted image that indicates a set of predicted crack pixels.

In another aspect, there is provided a system for attention-based surface crack segmentation. The system comprises: a memory storing instructions; one or more communication interfaces; and one or more hardware processors coupled to the memory via the one or more communication interfaces, wherein the one or more hardware processors are configured by the instructions to: receive a m-channel image. The system further comprises passing the received m-channel image through an edge detection algorithm to obtain a binary edge map of the m-channel image; concatenating the obtained binary edge map along with a channel dimension to obtain a (m+1) channel image; extracting a first set of feature maps from a plurality of stages of an encoder and a decoder by feeding the obtained (m+1)-channel image into a network, wherein the network comprises of the encoder, the decoder, an enhancement encoder, and a fused network, and wherein each of the plurality of stages of the encoder and the decoder comprises of a corresponding attention module; convolving the extracted first set of feature maps from the plurality of stages of the encoder and the decoder with an attention mask to obtain a second set of feature maps by passing the first set of feature maps through the corresponding attention module comprised in each of the plurality of stages of the encoder and the decoder respectively; merging the second set of feature maps obtained from the corresponding attention module comprised in the plurality of stages of the encoder and the decoder in the fused network to obtain a plurality of merged feature maps, wherein the second set of feature maps obtained from the corresponding attention module comprised in the plurality of stages of the encoder is fed into the enhancement encoder to obtain an output, wherein the obtained output serves as an input to the fused network, and wherein the second set of feature maps from the corresponding attention module comprised in the plurality of stages of the decoder is sequentially fed into the fused network; up sampling the plurality of merged feature maps by passing each of the plurality of merged feature maps through each of a deconvolutional layer comprised in the fused network; concatenating the plurality of up sampled feature maps and passing the concatenated feature maps through a convolution layer to obtain a final fused feature map; passing the final fused feature map through a sigmoid activation function to obtain a final fused probability map; and iteratively thresholding the final fused probability map using a plurality of threshold values to obtain an optimal threshold value wherein the obtained optimal threshold value is used to obtain a binary predicted image that indicates a set of predicted crack pixels.

In yet another aspect, there are provided one or more non-transitory machine-readable information storage mediums comprising one or more instructions which when executed by one or more hardware processors cause receiving a m-channel image; passing the received m-channel image through an edge detection algorithm to obtain a binary edge map of the m-channel image; concatenating the obtained binary edge map along with a channel dimension to obtain a (m+1) channel image; extracting a first set of feature maps from a plurality of stages of an encoder and a decoder by feeding the obtained (m+1)-channel image into a network, wherein the network comprises of the encoder, the decoder, an enhancement encoder, and a fused network, and wherein each of the plurality of stages of the encoder and the decoder comprises of a corresponding attention module; convolving the extracted first set of feature maps from the plurality of stages of the encoder and the decoder with an attention mask to obtain a second set of feature maps by passing the first set of feature maps through the corresponding attention module comprised in each of the plurality of stages of the encoder and the decoder respectively; merging the second set of feature maps obtained from the corresponding attention module comprised in the plurality of stages of the encoder and the decoder in the fused network to obtain a plurality of merged feature maps, wherein the second set of feature maps obtained from the corresponding attention module comprised in the plurality of stages of the encoder is fed into the enhancement encoder to obtain an output, wherein the obtained output serves as an input to the fused network, and wherein the second set of feature maps from the corresponding attention module comprised in the plurality of stages of the decoder is sequentially fed into the fused network; up sampling the plurality of merged feature maps by passing each of the plurality of merged feature maps through each of a deconvolutional layer comprised in the fused network; concatenating the plurality of up sampled feature maps and passing the concatenated feature maps through a convolution layer to obtain a final fused feature map; passing the final fused feature map through a sigmoid activation function to obtain a final fused probability map; and iteratively thresholding the final fused probability map using a plurality of threshold values to obtain an optimal threshold value wherein the obtained optimal threshold value is used to obtain a binary predicted image that indicates a set of predicted crack pixels.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

The embodiments herein provide a system and method for attention-based surface crack segmentation. The present disclosure solves the surface crack segmentation problem by employing an attention-based mechanism in multi-scale feature space. The present disclosure utilizes a combination of a soft-IoU (intersection-over-union) loss and a focal loss for a crack semantic segmentation task to reduce the pixel-level shift in the output and handle the data imbalance respectively as well as together, using an encoder-decoder network with a multi-task learning framework. Originally, a focal loss was designed for use in an object detection task. Further, the present disclosure, include a binary edge map of an input image, to give a noisy initialization of tentative locations of the crack pixels as a prior information to a network.

Referring now to the drawings, and more particularly to FIG. 1 through FIG. 5, where similar reference characters denote corresponding features consistently throughout the figures, there are shown preferred embodiments and these embodiments are described in the context of the following exemplary system and/or method.

Figure 1:
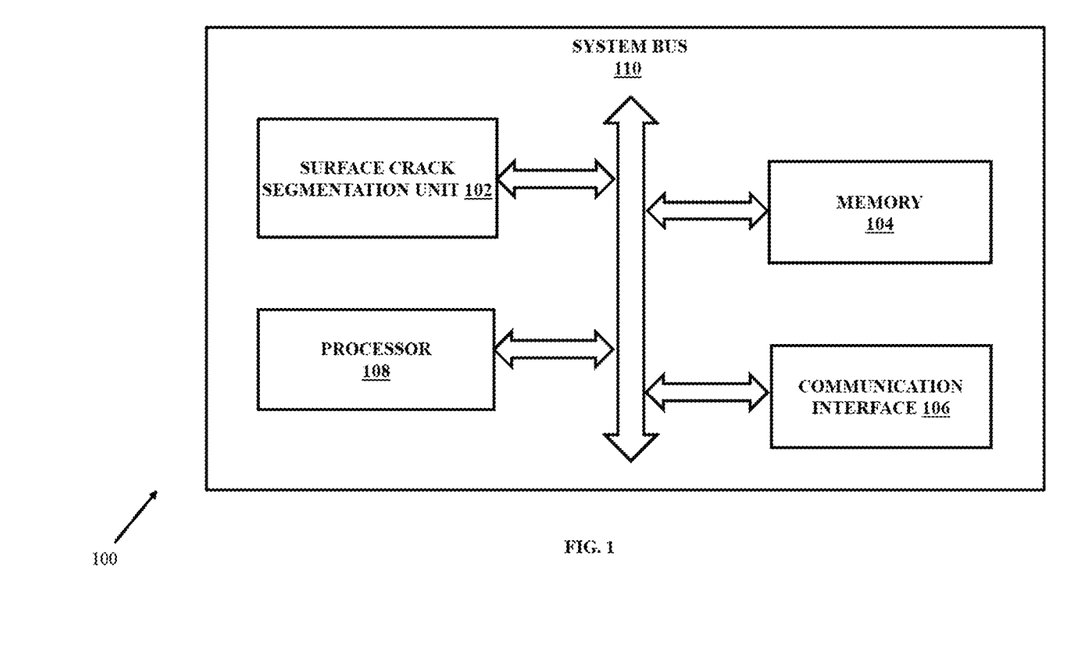
FIG. 1 illustrates an exemplary system for an attention-based surface crack segmentation, according to an embodiment of the present disclosure.

FIG. 1 illustrates an exemplary system for an attention-based surface crack segmentation, according to an embodiment of the present disclosure. The system 100 includes the surface crack segmentation unit 102 to solve the automatic surface crack segmentation problem using the attention-based surface crack segmentation method, in accordance with some embodiments of the present disclosure. The surface crack segmentation unit 102 includes or is otherwise in communication with a memory 104, a communication interface 106, and a processor 108. The memory 104, communication interface 106, and the processor 108 may be coupled by a system bus 110 or a similar mechanism. Although FIG. 1 shows example components of the surface crack segmentation unit 102, in other implementations, system 100 may contain fewer components, additional components, different components, or differently arranged components than depicted in FIG. 1.

The processor 108 may be implemented as one or more microprocessors, microcomputers, microcontrollers, digital signal processors, central processing units, state machines, logic circuitries, and/or any devices that facilitates in designing polymeric carrier for controlled release of molecules. Further, the processor 108 may comprise a multi-core architecture. Among other capabilities, the processor 108 is configured to fetch and execute computer-readable instructions or modules stored in the memory 104. The processor 108 may include circuitry implementing, among others, audio and logic functions associated with the communication. For example, the processor 108 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits. The processor 108 thus may also include the functionality to encode messages and/or data or information. The processor 108 may include, among other things, a clock, an arithmetic logic unit (ALU) and logic gates configured to support operation of the processor 108. Further, the processor 108 may include functionality to execute one or more software programs, which may be stored in the memory 104 or otherwise accessible to the processor 108.

The memory 104, may store any number of pieces of information, and data, used by the system 100 to implement the functions of the system 100. The memory 104 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. Examples of volatile memory may include but are not limited to volatile random-access memory (RAM). The non-volatile memory may additionally or alternatively comprise an electrically erasable programmable read only memory (EEPROM), flash memory, hard drive, or the like. The memory 104 may be configured to store information, data, applications, instructions, or the like for enabling the system 100 to carry out various functions in accordance with various example embodiments. Additionally, or alternatively, the memory 104 may be configured to store instructions which when executed by the processor 108 causes the system 100 to behave in a manner as described in various embodiments.

The communication interface(s) 106 can facilitate multiple communications within a wide variety of networks and protocol types, including wired networks, for example, local area network (LAN), cable, etc., and wireless networks, such as Wireless LAN (WLAN), cellular, or satellite. For the purpose, the communication interface (s) 106 may include one or more ports. One or more functionalities of the system 100 and components thereof, is further explained in detail with respect to block diagram described in FIG. 2.

Figure 2:
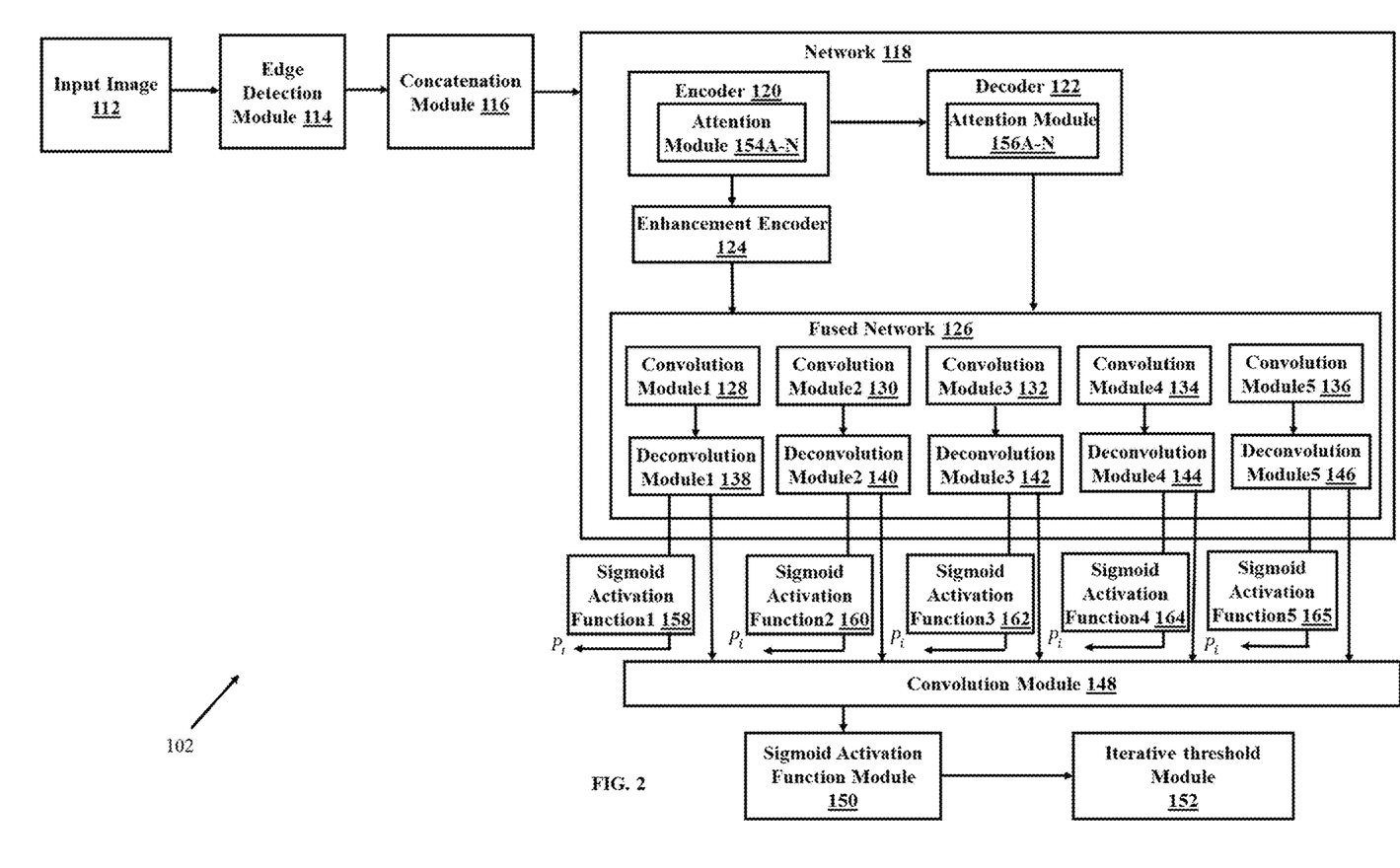
FIG. 2 is a functional block diagram of various modules stored in the surface crack segmentation unit of the system of FIG. 1 in accordance with some embodiments of the present disclosure.

FIG. 2, with reference to FIG. 1, is a functional block diagram of various modules stored in the surface crack segmentation unit 102 of the system 100 of FIG. 1 in accordance with some embodiments of the present disclosure. In an embodiment of the present disclosure, the surface crack segmentation unit 102 comprises of various modules that include an input image 112, an edge detection module 114, a concatenation module 116, a network 118, a convolution module 148, a plurality of sigmoid activation functions (e.g., sigmoid activation function1 158, sigmoid activation function2 160. sigmoid activation function3 162, sigmoid activation function4 164, sigmoid activation function5 166 and the like.), a sigmoid activation function module 150, and an iterative threshold module 152. The network 118 of the surface crack segmentation unit 102 further includes an encoder 120, a decoder 122, an enhancement encoder 124 and a fused network 126. The fused network 126 of the network 118 further includes one or more convolution modules (e.g., a convolution module1 128, a convolution module2 130, a convolution module3 132, a convolution module4 134, a convolution module5 136, and the like), and one or more deconvolution modules (e.g., a deconvolution module1 138, a deconvolution module2 140, a deconvolution module3 142, a deconvolution module4 144, a deconvolution module5 146, and the like). The encoder 120 further comprises of a plurality of attention modules 154A-N and the decoder 122 further comprises of a plurality of attention modules 156A-N.

Figure 3A:
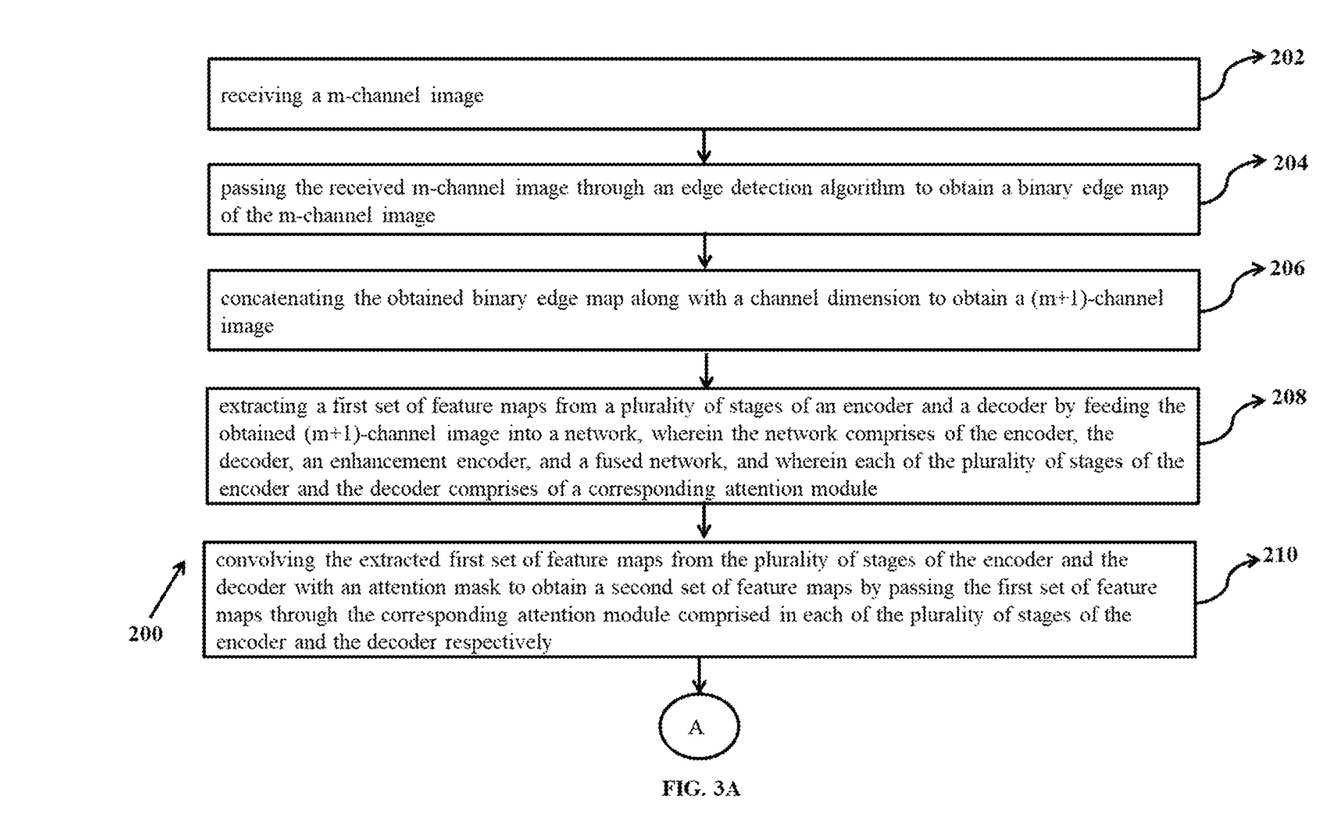
FIGS. 3A and 3B show a flow diagram illustrating the steps involved in a method for attention-based surface crack segmentation according to some embodiments of the present disclosure.
Figure 3B:
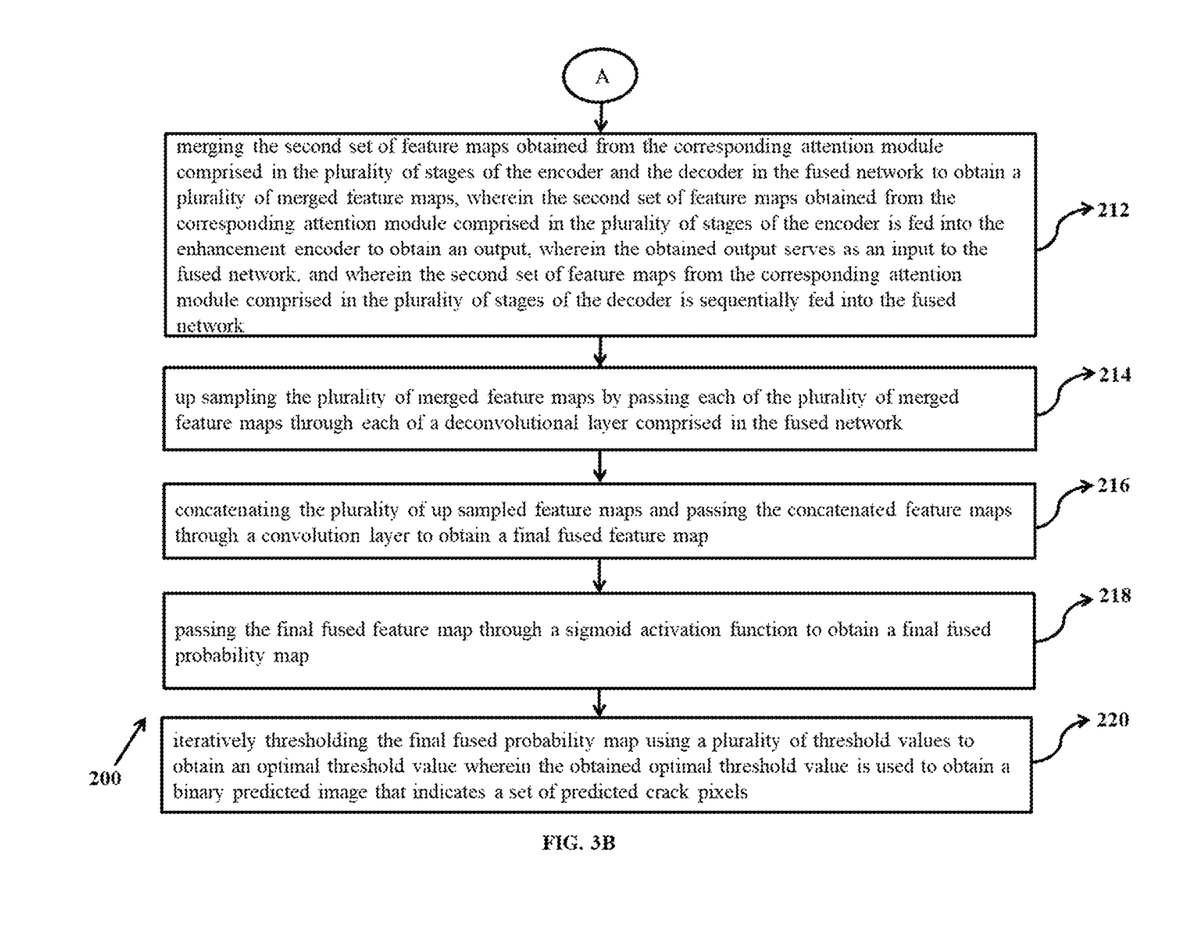

FIGS. 3A and 3B, with reference to FIGS. 1-2, is an exemplary flow diagram 200 illustrating a method for attention-based surface crack segmentation using the system 100 of FIG. 1 according to some embodiments of the present disclosure. In an embodiment, the system 100 comprises one or more data storage devices or the memory 104 operatively coupled to the one or more processors 108 and is configured to store instructions for execution of steps of the method by the surface crack segmentation unit 102. The steps of the method of the present disclosure will now be explained with reference to the components of the system 100 and the steps 202-220 as depicted in FIGS. 1-2, and the flow diagram as depicted in FIGS. 3A and 3B.

Operations of the flowchart, and combinations of operation in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the flowchart. It will be noted herein that the operations of the method 200 are described with help of system 102. However, the operations of the method 200 can be described and/or practiced by using any other system.

The disclosed method 200 relates to the attention-based surface crack segmentation. At step of the method 202, one or more hardware processors 108 receive a m-channel (e.g., 3 channel RGB (Red, Green and Blue) image (input image)) image. In an embodiment of the present disclosure, the input image 112 depicted in FIG. 2 may include a 3 channel RGB (Red, Green and Blue) image as input. At step of the method 204, the one or more hardware processors 108 pass the received m-channel image through an edge detection algorithm to obtain a binary edge map of the m-channel image. The present disclosure uses the Holistically Edge Detection (HED) method (as known in the art method) to generate the binary edge map of the input image 112 which is depicted by the module edge detection module 114 of FIG. 2. In practice, input pixels of red, green, and blue channels are normalized between −1 and +1 (known in the art) which is a standard trivial preprocessing step on a RGB data. In the present disclosure, binary (each pixel is either 0 or 1) edge map is used as the 4th channel wherein, the pixels of the edge map/edge channel information are binarized and not normalized. At step of the method 206, the one or more hardware processors 108, concatenate the obtained binary edge map along with a channel dimension to obtain a (m+1)-channel image (e.g., a 4-channel image), which is the input to the network 118. As depicted by the concatenation module 116 of FIG. 2, the 3 channel RGB (m-channel) image is concatenated with the corresponding single channel binary edge map and hence the input becomes a 4-channel image ((m+1)-channel). In general, the cracks do not have any specific shape and size and can occur naturally with random shapes and sizes, and like edges, cracks are thin, which is likely to be of 1 to 3-pixels width. Further, to bias the input image (e.g., 3 channel RGB image) with crack-like structures, the present disclosure biases the network's input data with the edge-like structures and uses the 4-channel image instead of the RGB image (e.g., 3 channel RGB image) as an input to the neural network (for example, the network 118), the fourth channel being the binary edge map of the RGB image. The output of the network 118 is the final fused feature map which is passed through the sigmoid activation function module 150 to obtain the final fused probability map. The obtained final fused probability map gives a per-pixel probability of being a crack pixel.

In an embodiment, at step 208 of the method 200, the one or more hardware processors 108 extract a first set of feature maps from a plurality of stages of an encoder and a decoder by feeding the obtained (m+1)-channel image into a network, wherein the network comprises of the encoder, the decoder, an enhancement encoder, and a fused network. Each of the plurality of stages of the encoder and the decoder comprises of a corresponding attention module (e.g., refer attention modules 154A-N and 156A-N respectively). Such stages of encoders, decoders and attention modules shall not be construed as limiting the scope of the present disclosure. In an embodiment, the present disclosure implements the network 118 which uses the encoder-decoder network architecture as the base network. The network 118 includes 4 sub-networks, the encoder 120, the decoder 122, the enhancement encoder 124, and the fused network 126 as described in earlier sections and as depicted FIG. 2, in one example embodiment. It is to be understood by a person having ordinary skill in the art or person skilled in the art the examples of such network(s) implementation(s) shall not be construed as limiting the scope of the present disclosure. In an embodiment, the encoder 120 is the most important part of the network 118, which extracts discriminative features from the (m+1)-channel image (for e.g., 4-channel image). Further the encoder 120 encodes the information from the (m+1)-channel image (for e.g., 4-channel image). More specifically, the purpose of the encoder 120 is to extract features maps from the (m+1)-channel image (for e.g., 4-channel image), which are unique to the foreground and background objects. The extracted first set of features maps are further processed and used by the further components of the network 118 to label each pixel as a crack or background pixel. At step 210 of the method 200, the one or more hardware processors 108 convolve the extracted first set of feature maps with an attention mask to obtain a second set of feature maps by passing the first set of feature maps through the corresponding attention module comprised in each of the plurality of stages of the encoder and the decoder respectively.

In an embodiment, at step 212 of the method 200, the one or more hardware processors 108 merge the second set of feature maps from the corresponding attention module comprised in the plurality of stages of the encoder and the decoder in the fused network to obtain a plurality of merged feature maps. The second set of feature maps obtained from the corresponding attention module comprised in the plurality of stages of the encoder is fed into the enhancement encoder to obtain an output, wherein the obtained output serves as an input to the fused network. The second set of feature maps from the corresponding attention module comprised in the plurality of stages of the decoder is sequentially fed into the fused network. In the fused network 126, the feature maps from the enhancement encoder 124 and the decoder 122 are merged using a corresponding convolutional module at each stage as depicted by the convolution module1 128, the convolution module2 130, the convolution module3 132, the convolution module4 134 and the convolution module5 136 as depicted in FIG. 2. At step 214 of the method 200, the one or more hardware processors 108 up sample the plurality of merged feature maps by passing each of the merged feature maps through each of a deconvolutional layer comprised in the fused network as depicted by the fused network 126, the deconvolution module1 138, the deconvolution module2 140, the deconvolution module3 142, the deconvolution module4 144, the deconvolution module5 146, the sigmoid activation function module 150 and the convolution modules (from 128 to 136) of the FIG. 2. Further, the plurality of up sampled feature maps are passed through the plurality of sigmoid activation functions (e.g., sigmoid activation function1 158, sigmoid activation function2 160. sigmoid activation function3 162, sigmoid activation function4 164, sigmoid activation function5 166 and the like.) to obtain a plurality of probability maps $P^i$ at each stage of the fused network 126, wherein each probability map from the plurality of probability maps $P^i$ is used to calculate a focal loss at each stage of the fused network 126. In general, crack detection problem is inherently a data imbalance problem. Therefore, to efficiently handle this problem the focal loss, is used to reduce the dominance of background pixels during training and efficiently handle the data imbalance. Further, during training the focal loss does not give equal weights to positive and negative class. Rather it gives more weight to examples of the positive class, which are in minority and gives less weight to examples of the negative class, which are in brute majority.

At step 216 of the method 200, the one or more hardware processors 108 concatenate the plurality of up sampled feature maps and pass the concatenated feature maps through a convolution layer to obtain a final fused feature map. The convolutional module 148 is used to fuse the concatenated features maps from the five stages of the fused network 126 into a single feature map as depicted in the FIG. 2. It is to be note that such stages of the fused network shall not be construed as limiting scope of the present disclosure. At step 218 of the method 200, the one or more hardware processors 108 pass the final fused feature map through a sigmoid activation function to obtain a final fused probability map. The final fused probability map is further used for calculating a focal loss and a soft-IoU loss, wherein the soft-IoU loss is used to reduce the shift at pixel level between predictions and the single-channel binary ground truth. The sigmoid activation function module 150 of the surface crack segmentation unit 102 of FIG. 2 is used to obtain a final fused probability map. It is to be noted that the plurality of sigmoid activation functions (e.g., sigmoid activation function1 158, sigmoid activation function2 160. sigmoid activation function3 162, sigmoid activation function4 164, sigmoid activation function5 166 and the like.) used to obtain a plurality of probability maps $P^i$ at each stage of the fused network 126 are different from the sigmoid activation function module 150 which is used obtain a final fused probability map from the final fused feature map, in an embodiment of the present disclosure. At step 220 of the method 200, the one or more hardware processors 108 iteratively thresholding the final fused probability map using a plurality of threshold values to obtain an optimal threshold value wherein the obtained optimal threshold value is used to obtain a binary predicted image that indicates a set of predicted crack pixels as depicted by the iterative threshold module 152 of FIG. 2. In an embodiment of the present disclosure, the final fused probability map is thresholded to obtain a binary output or the binary predicted image. The term 'iterative' is used here, as a plurality of thresholds values are used or tested, to choose/select a good threshold. In an example embodiment of the present disclosure, 100 values of threshold are tested. However, such values of threshold are not construed as the limiting scope of the present disclosure. Further, for each of the plurality of thresholds values a corresponding binary predicted image is obtained, wherein a F-score is calculated between the single-channel binary ground-truth and obtained binary predicted image corresponding to each of the plurality of threshold values. Further, the threshold value corresponding to a maximum F-score is selected as an optimal threshold value which is explained in detail in the later sections of the present disclosure.

Figure 4A:
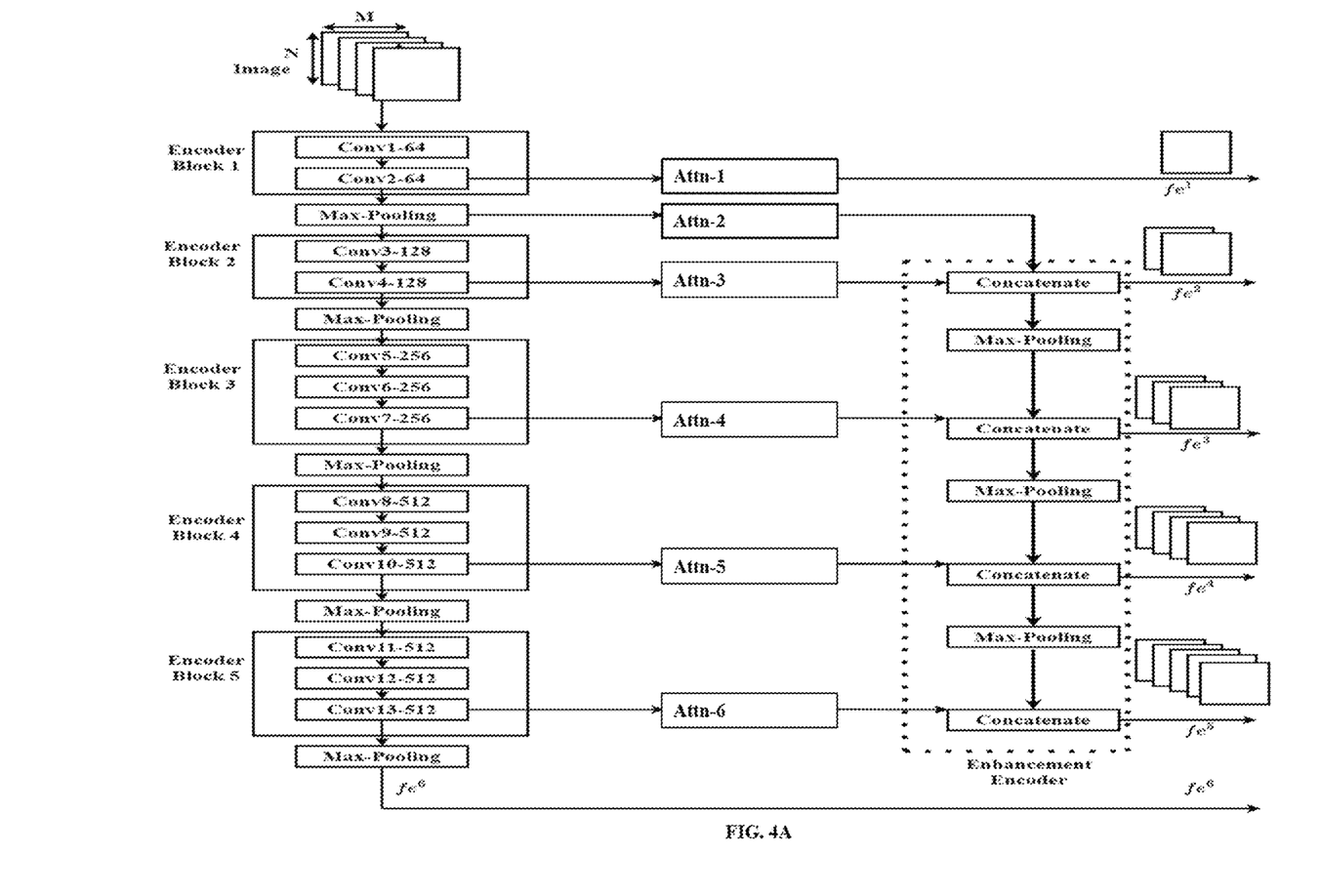
FIGS. 4A and 4B shows a network diagram of a SCNet (Supervised CrackNet) Architecture illustrating the system and method for attention-based surface crack segmentation according to some embodiments of the present disclosure.
Figure 4B:
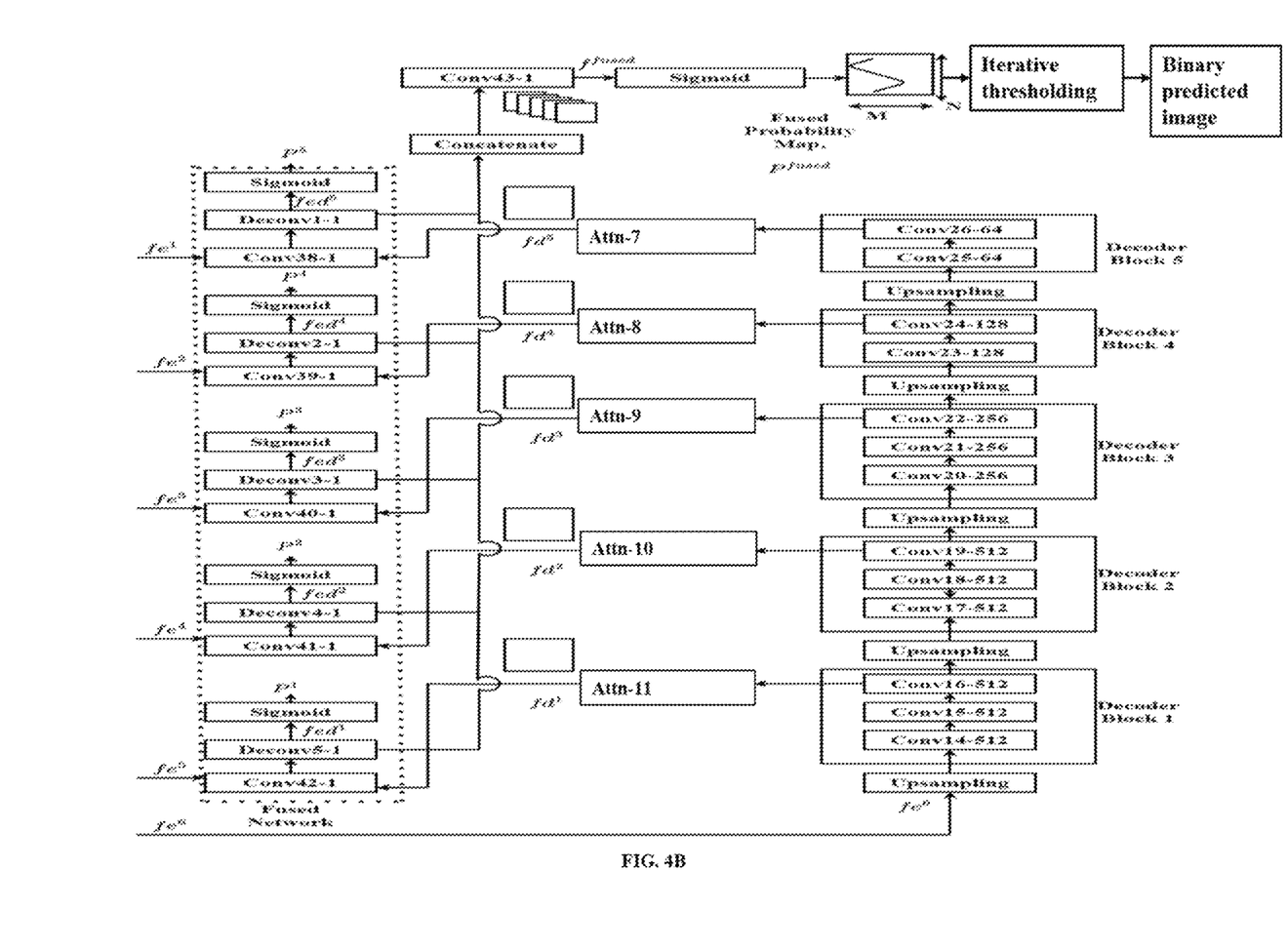

FIGS. 4A and 4B shows a network diagram of a SCNet (Supervised CrackNet) Architecture illustrating the system and method for attention-based surface crack segmentation according to some embodiments of the present disclosure. In an embodiment, the present disclosure implements the network 118 which uses the encoder-decoder network architecture as the base network as depicted in FIGS. 4A and 4B and as described above in the earlier sections. Referring to FIG. 4A, the input to the network is a 4-channel image and the output of the network is a single-channel segmented image of the same size, in which white pixels represent the crack pixels and black pixels represent the non-crack pixels. Further the encoder contains 5 encoder blocks with 13 convolutional layers in total, placed sequentially, as depicted in FIG. 4A. After each encoder block, a max-pooling layer is used to down sample the size of the feature maps to half of its size. Further the encoder 120 encodes the information from the 4-channel image and extracts the feature maps wherein the extracted features are further processed to give relative weights to the pixels as described above in the earlier sections. In the network 118, the decoder 122 aims to unpack the information from the extracted feature maps and the network 118 includes 5 decoder blocks, as depicted in FIG. 4B. Before each decoder block, an up-sampling layer is used to up-sample the size of the feature maps. Since both encoder and decoder have five stages, in an embodiment of the present disclosure, and each stage represents feature maps of different sizes, intuitively encoder and decoder also represent the scale-space representation of the feature maps.

In an embodiment, the network 118 of the present disclosure uses an enhancement encoder subnetwork (i.e., the enhancement encoder 124 of FIG. 2). The feature maps from the encoder at each stage first passes through a set of attention modules as depicted in FIG. 4A. Further the attention modules generate new refined feature maps from the original feature maps and are used at both the encoder 120 and the decoder 122 side wherein this attention-driven refinement highlights the details of the foreground objects in the feature space. The refined feature maps are then fed into the enhancement encoder subnetwork (i.e., the enhancement encoder 124 of FIG. 2), pre-existing in the base network (network 118). The purpose of having the enhancement encoder 124 is to extract meaningful information from the feature maps of the deeper stages, because cracks are thin and low-dimensional objects and are represented well with the shallower-level features maps, so inside the enhancement encoder 124, the feature maps from the deeper layers are improved by merging them with the feature maps of the shallower-layers. Here, the "meaningful information" refers to the discriminative information which can be obtained from the feature maps. Further, the discriminative information assists the network 118 to distinguish between the crack pixels and non-crack pixels i.e., the per-pixel classification task. In practice, the feature maps from the earlier stages are concatenated along the channel dimension with the feature maps from the lower stages and passed forward for further stages. The use of max-pooling layers inside the enhancement encoder is done to down-sample the concatenated maps to bring their spatial size equivalent to the size of the feature maps of the lower stage as depicted in FIG. 4A.

In an embodiment, referring to FIGS. 4A and 4B, both encoder 120 and decoder 122 have 5 stages. In the fused subnetwork (i.e., fused network 126), the refined feature maps from each stage of the encoder are merged with the feature maps from the corresponding stage of the decoder. Therefore, the fused network also has 5 stages. Such stages of fused network shall not be construed as limiting the scope of the present disclosure. Further, the feature maps from the i-th stage of the encoder are concatenated with the feature maps from the i-th stage of the decoder along the channel dimension. The concatenated feature maps are then passed through a 1×1 convolutional layer, deconvolutional layer, and sigmoid activation function as depicted in FIG. 4B. The convolutional layer is used to fuse the concatenated feature maps, deconvolutional layer is used to up sample the feature map to the original size of the input image. The final fused feature map is then passed through the sigmoid activation function 150 to obtain a final fused probability map as depicted in FIG. 4B.

In an embodiment of the present disclosure, notations of the feature maps of the encoder, the decoder, the probability maps at each stage, and the fused probability map are defined as below:

1. $fe^i$=Feature maps of the i-th stage of the encoder going into the fused subnetwork.
2. $fd^i$=Feature maps of the i-th stage of the decoder going into the fused subnetwork.
3. $fed^i$=The output of the deconvolutional layer in the fused subnetwork at i-th stage.
4. $P^i$=Predicted probability map at each stage in the fused subnetwork.
5. $f^{fused}$=The fused feature map used to obtain a fused probability map.
6. $P^{fused}$—Final fused probability map.
7. X—A 4-channel input image of size M×N.
8. Y—A single-channel binary ground-truth image of size M×N.

In general, the choice of the loss function plays a major role in training a model. Traditionally, cross-entropy loss was used for the image segmentation task. The equation of binary cross-entropy loss is given below:

$$CE = -[y^* \log p + (1-y)^* \log (1-p)] \quad (1)$$

where y is the ground-truth, y∈{0, 1} and p is the predicted probability. An equivalent expression of the above equation can be obtained and expressed as:

$$CE = \begin{cases} -\log(p) & y = 1 \\ -\log(1-p) & \text{otherwise} \end{cases} \quad (2)$$

Let's define a variable $p_t$, mathematically, $$\begin{cases} p_t & y = 1 \\ (1 - p_t) & \text{otherwise} \end{cases} \quad (3)$$

And hence, the expression of cross-entropy loss is (or can be) written as:

$$CE = -\log (p_t) \quad (4)$$

In an embodiment, the present disclosure uses the focal loss, a pixel-wise adaptation of a loss calculated over bounding boxes, originally introduced for the object detection task. The focal loss gives less importance to the negative samples, which are in brute majority, and gives more attention to positive samples, which are in minority, thus indirectly handling the problem of data imbalance. Mathematically, the focal loss is defined as $$FL = -\alpha_t^*(1-p_t)^{\gamma_*} \log p_t \quad (5)$$

Where, $p_t$ is the probability of a pixel being a crack pixel, $-\alpha_t$ is a constant, $\gamma$ is a constant and $p_t$, $\alpha_t$, $\gamma$ decides the weight which will be assigned to correctly and wrongly classified pixels during training. The present disclosure uses the focal loss as the loss function, I(f,Y) for the crack detection problem. One of the major problems in the crack detection task, which is observed experimentally, is the pixel level shift between the final predicted image and the single binary ground-truth. Due to this, the performance of the model reduces. Ideally, the predicted binary image should completely overlap with the single binary ground-truth. The overlap between the output and the single binary ground-truth is measured using a metric called IoU, Intersection Over Union. If the predicted binary image and the single-channel binary ground-truth completely overlaps, then IoU becomes 1. For a crack detection problem, which is solved following semantic segmentation approach, IoU metric is measured using:

$$IoU = \frac{TP}{TP + FP + FN} \quad (6)$$

To incorporate IoU metric as a loss function, IoU loss can be used, which is given as $$L^{IoU} = 1 - IoU \quad (7)$$

$$L^{IoU} = \frac{FP + FN}{TP + FP + FN} \quad (8)$$

However, the problem with $L^{IoU}$ is its non-differentiable nature because of True Positives (TP), False positives (FP), False Negatives (FN) being discrete values. Due to the non-differentiability of the loss, it is not possible to calculate the gradients which are needed for back propagation. To incorporate the $L^{IoU}$ in the total loss, it is required to have $L^{IoU}$ in the continuous form. The present disclosure uses the Soft-IoU loss, which is a continuous approximation of the $L^{IoU}$. Therefore, in the present disclosure, the final loss is the combination of focal loss and soft-IoU Loss.

In an embodiment, the total loss function used in the present disclosure is a combination of the focal loss and the soft-IoU loss. The focal loss is calculated between the final fused probability map, $P^{fused}$ and the single-channel binary ground-truth and between the probability maps, $P^i$ at each stage of the fused network 126 and the single-channel binary ground-truth. Further, the soft-IoU loss is calculated between the final fused probability map, $P^{fused}$ and the single-channel binary ground-truth. The probability map at i-th stage is defined as follows.

The probability map at i-th stage is defined as follows, $$P^i = \frac{1}{1 + e^{-fed^i}} \quad (9)$$

Similarly, the final fused probability map is obtained by, $$P^{fused} = \frac{1}{1 + e^{-f^{fused}}} \quad (10)$$

The final fused probability map gives the final probability of the input pixel being a crack pixel or the background pixel. Further, the final fused probability map is obtained from the final fused feature map obtained by passing the final fused feature map through a sigmoid activation function. Each probability map from the plurality of probability maps $P^i$ and the single-channel ground-truth, Y is used to calculate the focal loss at each stage of the fused network. Let $L_{focal}^i$ denote the focal loss obtained at the i-th scale using $P^i$ and single-channel ground-truth Y, and $L_{focal}^{fused}$ denotes the focal loss obtained using the final fused probability map, $P^{fused}$ and the single-channel binary ground-truth.

Let, the size of an input image is M×N. Mathematically the loss equations are:

$$L_{focal}^{total} L_{focal}^{fused} + \Sigma_{i=1}^5 w_i * L_{focal}^i \quad (11)$$

$$L_{focal}^i \Sigma_{j=1}^{MN} l(f_j^i, y_j) \quad (12)$$

$$L_{focal}^{fused} = \Sigma_{j=1}^{MN} l(f_j^{fused}, y_j) \quad (13)$$

$$L_{focal}^{total} \Sigma_{j=1}^{MN} l(f_j^{fused}, y_j) + \Sigma_{j=1}^{MN} \Sigma_{i=1}^5 w_i * l(f_j^i, y_j) \quad (14)$$

$$L^{IoU} = \text{IoU}(p^{fused}, Y) \quad (15)$$

$$L_{total} = L_{focal}^{total} + L^{IoU} \quad (16)$$

where $w_i$ are scalar weights used to give relative importance to the individual stage in training.

In an embodiment, the training details of the attention-based model for surface crack segmentation as implemented and described herein is as follows:

The complete training of the attention-based model is done using python3.6, cuda10.2, and torch1.5.1.
Input Image size is fixed to 256×256.
Training is optimized using Stochastic Gradient Descent, with learning rate=0.0001, momentum is 0.9, and weight decay=0.0002
Number of epochs=200

In an embodiment, the per-pixel accuracy is used to be a common metric for the image segmentation task. However, the per-pixel accuracy metric gives a better model when using the balanced dataset. Specifically, for the crack detection problem, the present disclosure uses a F-score, which is a suitable metric for the image segmentation task when using an imbalanced dataset. In an embodiment, F-score is the name of an output metric/performance measure, which is used to compare different methods in the image segmentation task and using F-score the dominance of majority pixels can be ignored. In this regard, the present disclosure thresholds the final fused probability map using the iterative thresholding process which is depicted by the iterative threshold module 152 of FIG. 2, and obtain the true positives (TP), false positives (FP), and true negatives (TN) by comparing with the corresponding single-channel binary ground-truth. The F-score is measured using the harmonic mean of precision and recall. Further, the precision gives the ratio of correctly labeled crack pixels among all the predicted crack pixels and recall gives the ratio of correctly labeled crack pixels among all the crack pixels. Mathematically, these two terms can be defined as, $$\text{Precision} = \frac{TP}{TP + FP} \quad (17)$$

$$\text{Recall} = \frac{TP}{TP + FN} \quad (18)$$

$$F = \frac{2 * \text{Precision} * \text{Recall}}{\text{Precision} + \text{Recall}} \quad (19)$$

Figure 5:
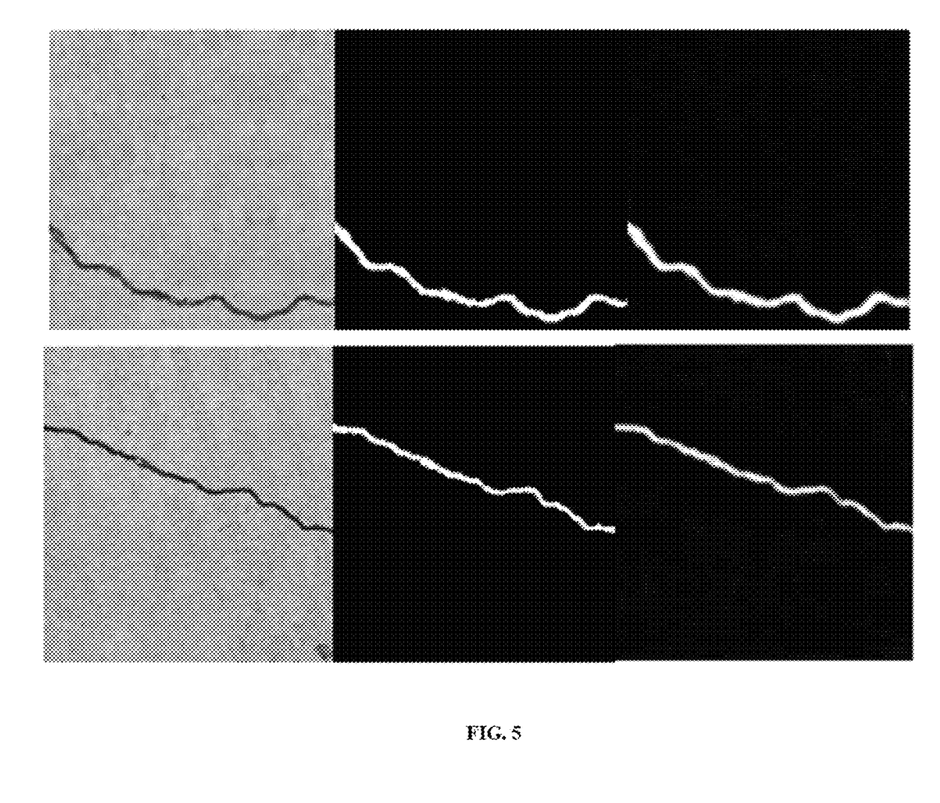
FIG. 5 is a use case example illustrating proposed surface crack segmentation according to some embodiments of the present disclosure.

FIG. 5 is a use case example illustrating proposed surface crack segmentation according to some embodiments of the present disclosure. Referring to FIG. 5, the leftmost image is the actual RGB image, the image in the middle represents the single-channel binary ground-truth, the rightmost image is the final fused crack probability image. To obtain the F-score, the rightmost image is thresholded and compared with the single-channel binary ground-truth, to obtain true positives, false positives and false negatives.

In an embodiment, Table 1 represents the comparison of the described approach of the present disclosure against other two recent crack-detection works on three different datasets. Below Table 1 gives details of the comparison wherein the performance of each method is measured using F-score.

TABLE 1

Performance Comparison with recent crack-detection works.

| Methods | Datasets | | | | Wessex |
| --- | --- | --- | --- | --- | --- |
| | Codebrim | Deepcrack | Crackforest | METU | Water |
| HCNN | 57.14 | 87.58 | 79.56 | 65.40 | 87.23 |
| DeepCrack - 1 | 61.14 | 86 | 85.75 | 66.10 | 90.38 |
| DeepCrack - 2 | 54.88 | 84.8 | 64 | 57.86 | 89.91 |
| Method of the present disclosure | 64.08 | 90.85 | 89.23 | 69.13 | 94.43 |

Hence, a system and method for attention-based surface crack segmentation. The present disclosure addresses an open aspect of automatic crack segmentation problem, that of generalizing and improving the performance of segmentation across a variety of scenarios. More specifically, the present disclosure implements a generalized approach for surface crack segmentation. The present disclosure is validated on a variety of datasets related to surveillance of different infrastructures, under varying conditions to compare the performance of the attention-based model of the present disclosure with other state of art models. Further, the attention-based model as implemented and described herein by the present disclosure is validated from both semantic segmentation and anomaly detection point of views, since crack is also a surface anomaly and occurs as a rare spatial event. The present disclosure further uses a single baseline architecture, which is derived from SegNet.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method, comprising:
receiving, via one or more hardware processors, a m-channel image;
passing, via the one or more hardware processors, the received m-channel image through an edge detection algorithm to obtain a binary edge map of the m-channel image;
concatenating, via the one or more hardware processors, the obtained binary edge map along with a channel dimension to obtain a (m+1) channel image;
extracting, via the one or more hardware processors, a first set of feature maps from a plurality of stages of an encoder and a decoder by feeding the obtained (m+1)-channel image into a network, wherein the network comprises of the encoder, the decoder, an enhancement encoder, and a fused network, and wherein each of the plurality of stages of the encoder and the decoder comprises of a corresponding attention module;
convolving, via the one or more hardware processors, the extracted first set of feature maps from the plurality of stages of the encoder and the decoder with an attention mask to obtain a second set of feature maps by passing the first set of feature maps through the corresponding attention module comprised in each of the plurality of stages of the encoder and the decoder respectively;
merging, via the one or more hardware processors, the second set of feature maps obtained from the corresponding attention module comprised in the plurality of stages of the encoder and the decoder in the fused network to obtain a plurality of merged feature maps, wherein the second set of feature maps obtained from the corresponding attention module comprised in the plurality of stages of the encoder is fed into the enhancement encoder to obtain an output, wherein the obtained output serves as an input to the fused network, and wherein the second set of feature maps from the corresponding attention module comprised in the plurality of stages of the decoder is sequentially fed into the fused network;
up sampling, via the one or more hardware processors, the plurality of merged feature maps by passing each of the plurality of merged feature maps through each of a deconvolutional layer comprised in the fused network;
concatenating, via the one or more hardware processors, the plurality of up sampled feature maps and passing the concatenated feature maps through a convolution layer to obtain a final fused feature map;
passing, via the one or more hardware processors, the final fused feature map through a sigmoid activation function to obtain a final fused probability map; and
iteratively thresholding, via the one or more hardware processors, the final fused probability map using a plurality of threshold values to obtain an optimal threshold value wherein the obtained optimal threshold value is used to obtain a binary predicted image that indicates a set of predicted crack pixels.

2. The processor implemented method of claim 1, wherein each of the plurality of up sampled feature maps are further passed through each of a plurality of sigmoid activation function to obtain a plurality of probability maps $P^i$ at each stage of the fused network, and wherein each probability map from the plurality of probability maps $P^i$ and a single-channel binary ground-truth are used to calculate a focal loss at each stage of the fused network.

3. The processor implemented method of claim 2, wherein the focal loss is used to reduce the dominance of background pixels during training.

4. The processor implemented method of claim 1, wherein the step of passing the final fused feature map through the sigmoid activation function to obtain the final fused probability map comprises calculating a focal loss and a soft-Intersection over Union (Soft IoU) loss.

5. The processor implemented method of claim 4, wherein the soft-IoU loss is used to reduce the shift at pixel level between predictions and the single-channel binary ground-truth.

6. A system, comprising:
a memory storing instructions;
one or more communication interfaces; and
one or more hardware processors coupled to the memory via the one or more communication interfaces, wherein the one or more hardware processors are configured by the instructions to:
receive a m-channel image;
pass the received m-channel image through an edge detection algorithm to obtain a binary edge map of the m-channel image;
concatenate the obtained binary edge map along with a channel dimension to obtain a (m+1)-channel image;
extract a first set of feature maps from a plurality of stages of an encoder and a decoder by feeding the obtained (m+1)-channel image into a network, wherein the network comprises of the encoder, the decoder, an enhancement encoder, and a fused network and wherein each of the plurality of stages of the encoder and the decoder comprises of a corresponding attention module;
convolve the extracted first set of feature maps from the plurality of stages of the encoder and the decoder with an attention mask to obtain a second set of feature maps by passing the first set of feature maps through the corresponding attention module comprised in each of the plurality of stages of the encoder and the decoder respectively;
merge the second set of feature maps from the corresponding attention module comprised in the plurality of stages of the encoder and the second set of feature maps from the corresponding attention module comprised in the plurality of stages of the decoder in the fused network to obtain a plurality of merged feature maps, wherein the second set of feature maps obtained from the corresponding attention module comprised in the plurality of stages of the of the encoder is fed into the enhancement encoder to obtain an output, wherein the obtained output serves as an input to the fused network and, wherein the second set of feature maps from the corresponding attention module comprised in the plurality of stages of the decoder is sequentially fed into the fused network;
up sample the plurality of merged feature maps by passing each of the plurality of merged feature maps through each of a deconvolutional layer comprised in the fused network;
concatenate the plurality of up sampled feature maps and passing the concatenated feature maps through a convolution layer to obtain a final fused feature map;
pass the final fused feature map through a sigmoid activation function to obtain a final fused probability map; and
iteratively threshold the final fused probability map using a plurality of threshold values to obtain an optimal threshold value wherein the obtained optimal threshold value is used to obtain a binary predicted image that indicates a set of predicted crack pixels.

7. The system of claim 6, wherein each of the plurality of up sampled feature maps are further passed through each of a plurality of sigmoid activation function to obtain a plurality of probability maps $P^i$ at each stage of the fused network, and wherein each probability map from the plurality of probability maps $P^i$ and a single-channel binary ground-truth are used to calculate a focal loss at each stage of the fused network.

8. The system of claim 7, wherein the focal loss is used to reduce the dominance of background pixels during training.

9. The system of claim 6, wherein the step of passing the final fused feature map through the sigmoid activation function to obtain the final fused probability map comprises calculating a focal loss and a soft-Intersection over Union (Soft IoU) loss.

10. The system of claim 9, wherein the soft-IoU loss is used to reduce the shift at pixel level between predictions and the single-channel binary ground-truth.

11. One or more non-transitory machine-readable information storage mediums comprising one or more instructions which when executed by one or more hardware processors cause:
receiving a m-channel image;
passing the received m-channel image through an edge detection algorithm to obtain a binary edge map of the m-channel image;
concatenating the obtained binary edge map along with a channel dimension to obtain a (m+1) channel image;
extracting a first set of feature maps from a plurality of stages of an encoder and a decoder by feeding the obtained (m+1)-channel image into a network, wherein the network comprises of the encoder, the decoder, an enhancement encoder, and a fused network, and wherein each of the plurality of stages of the encoder and the decoder comprises of a corresponding attention module;
convolving the extracted first set of feature maps from the plurality of stages of the encoder and the decoder with an attention mask to obtain a second set of feature maps by passing the first set of feature maps through the corresponding attention module comprised in each of the plurality of stages of the encoder and the decoder respectively;
merging the second set of feature maps obtained from the corresponding attention module comprised in the plurality of stages of the encoder and the decoder in the fused network to obtain a plurality of merged feature maps, wherein the second set of feature maps obtained from the corresponding attention module comprised in the plurality of stages of the encoder is fed into the enhancement encoder to obtain an output, wherein the obtained output serves as an input to the fused network, and wherein the second set of feature maps from the corresponding attention module comprised in the plurality of stages of the decoder is sequentially fed into the fused network;

up sampling the plurality of merged feature maps by passing each of the plurality of merged feature maps through each of a deconvolutional layer comprised in the fused network;

concatenating the plurality of up sampled feature maps and passing the concatenated feature maps through a convolution layer to obtain a final fused feature map;

passing the final fused feature map through a sigmoid activation function to obtain a final fused probability map; and iteratively thresholding the final fused probability map using a plurality of threshold values to obtain an optimal threshold value wherein the obtained optimal threshold value is used to obtain a binary predicted image that indicates a set of predicted crack pixels.

12. The one or more non-transitory machine readable information storage mediums of claim 11, wherein each of the plurality of up sampled feature maps are further passed through each of a plurality of sigmoid activation function to obtain a plurality of probability maps $P^i$ at each stage of the fused network, and wherein each probability map from the plurality of probability maps $P^i$ and a single-channel binary ground-truth are used to calculate a focal loss at each stage of the fused network.

13. The one or more non-transitory machine readable information storage mediums of claim 12, wherein the focal loss is used to reduce the dominance of background pixels during training.

14. The one or more non-transitory machine readable information storage mediums of claim 11, wherein the step of passing the final fused feature map through the sigmoid activation function to obtain the final fused probability map comprises calculating a focal loss and a soft-Intersection over Union (Soft IoU) loss.

15. The one or more non-transitory machine readable information storage mediums of claim 14, wherein the soft-IoU loss is used to reduce the shift at pixel level between predictions and the single-channel binary ground-truth.

* * * * *